United States Patent
Nishiumi

Patent Number: 6,014,516
Date of Patent: Jan. 11, 2000

[54] LANGUAGE PROCESSING SYSTEM WHICH GENERATES DEBUGGING SOURCE FILE CORRESPONDING TO OPTIMIZATION IMAGE AND METHOD THEREFOR

[75] Inventor: Hiroyasu Nishiumi, Tokyo, Japan

[73] Assignee: NEC Corporation, Tokyo, Japan

[21] Appl. No.: 08/996,426

[22] Filed: Dec. 22, 1997

[30] Foreign Application Priority Data

Dec. 27, 1996 [JP] Japan .................................. 8-349247

[51] Int. Cl.[7] .............................. G06F 9/45; G06F 11/28
[52] U.S. Cl. ........................ 395/705; 395/709; 395/707; 395/704; 714/35; 714/38
[58] Field of Search ................................. 395/704, 705, 395/707, 709; 714/35, 38, 25, 46, 47; 704/1

[56] References Cited

U.S. PATENT DOCUMENTS

| | | | |
|---|---|---|---|
| 4,773,007 | 9/1988 | Kanada et al. | 395/709 |
| 4,833,606 | 5/1989 | Iwasawa et al. | 395/709 |
| 5,598,561 | 1/1997 | Funaki | 395/706 |
| 5,606,697 | 2/1997 | Ono | 395/707 |
| 5,758,164 | 5/1998 | Inoue | 395/709 |
| 5,832,273 | 11/1998 | Mizuse | 395/709 |

FOREIGN PATENT DOCUMENTS

| | | |
|---|---|---|
| 5-158706 | 6/1993 | Japan . |
| 6-274369 | 9/1994 | Japan . |
| 7-271606 | 10/1995 | Japan . |
| 8-63369 | 3/1996 | Japan . |
| 8-255097 | 10/1996 | Japan . |

OTHER PUBLICATIONS

Adl–Tabatabai et al., "Source–level debugging of scalar optimized code," Proceedings of the ACM SIGPLAN '96 conference on Programming language design and implementation, vol. 31, No. 5, pp. 33–43, May 1996.

Pollock et al., "Incremental global optimization for fast recompilations," International Conference on Computer Languages, 1990, pp. 281–290, Mar. 1990.

*Primary Examiner*—Tariq R. Hafiz
*Assistant Examiner*—Tuan Q. Dam
*Attorney, Agent, or Firm*—Foley & Lardner

[57] ABSTRACT

A language processing system including a parsing unit for receiving input of a source file to be processed and conducting parsing processing of the same, an optimization unit for receiving input of intermediate data generated by the parsing unit and conducting optimization processing of the same, a debugging source program information generating unit for generating a debugging source file which reflects the contents of optimization and whose form is approximate to a source file based on optimized intermediate data, and further, adding debug information obtained in the course of the generation of a debugging source file to optimized intermediate data, and a code generating unit for receiving input of intermediate data with debug information added and coding the same to generate an object file.

12 Claims, 12 Drawing Sheets

FIG. 3

```
1:   int i, j, k;
2:   char a[100], b[100];
3:
4:   main()
5:   {
6:      i = 0
7:      L1:
8:         a[i]   = b[i]   + i;
9:         a[i+1] = b[i+1] + i + 1;
10:        a[i+2] = b[i+2] + i + 2;
11:        a[i+3] = b[i+3] + i + 3;
12:        i += 4;
13:     if(i <= 100) goto L1;
14:  }
```

DEBUGGING SOURCE PROGRAM
(sample_o.c)

FIG. 4A

```
_main:
      FILE    sample.c
      LINE    5
      FILE    sample_o.c
      LINE    5
      LDC     0
      STR     _i         i = 0
.L1:
      FILE    sample.c
      LINE    8
      FILE    sample_o.c  ◄──── 141
      LINE    8
      LOD     _i
      LDA     _a
      ADD                ADDRESS OF a[i]
      LOD     _i
      LDA     _b
      ADD                ADDRESS OF b[i]
      ILD                b[i]
      LOD     _i         i
      ADD                b[i] + i
      IST                a[i] = b[i] + i
;
      FILE    sample_o.c  ◄──── 142
      LINE    9
      LOD     _i
      LDC     1
      ADD                i + 1
      .
      .
      ADD                i + 1
      IST                a[i+1] = b[i+1] + i
;
      FILE    sample_o.c
      LINE    10
      LOD     _i
      LDC     2
      ADD                i + 2
      .
      .
      ADD                i + 2
      ADD                b[i+2] = i + 2
      IST                a[i+2] = b[i+2] + i + 2
;
```

FIG. 4B

```
        FILE    sample_o.c
        LINE    11
        LOD     _i
        LDC     3
        ADD             i + 3
        LDA     _a
        ADD             ADDRESS OF a[i+3]
        LOD     _i
        LDC     3
        ADD             i + 3
        LDA     _b
        ADD             ADDRESS OF b[i+3]
        ILD             b[i+3]
        LOD     _i      i
        LDC     3
        ADD             i + 3
        ADD             b[i+3] = i + 3
        IST             a[i+3] = b[i+3] + i + 3
;
        FILE    sample_o.c
        LINE    12
        LOD     _i
        LDC     4
        ADD             i + 4
        STR     _i      i = i + 4 (i += 4)
;
        FILE    sample.c
        LINE    6
        FILE    sample_o.c
        LINE    6
        LOD     _i
        LDC     100
        CMP             i <= 100
        LEQ     .L1
```

| sample.c | | | sample_o.c | | |
|---|---|---|---|---|---|
| | 1: | int i; | | 1: | int i, j, k; |
| | 2: | char a[100], b[100]; | | 2: | char a[100], b[100]; |
| | 3: | | | 3: | |
| | 4: | main() | | 4: | main() |
| | 5: | { | | 5: | { |
| | 6: | for(i = 0; i <= 100; ++i) | | 6: | i = 0 |
| | 7: | { | | 7: | L1: |
| B | 8: | a[i] = b[i] + i; | | 8: | a[i] = b[i] + i; |
| | 9: | } | | 9: | a[i+1] = b[i+1] + i + 1; |
| | 10: | } | B | 10: | a[i+2] = b[i+2] + i + 2; |
| | | | | 11: | a[i+3] = b[i+3] + i + 3; |
| | | | | 12: | i += 4; |
| | | | | 13: | if(i <= 100) goto L1; |
| | | | | 14: | } |

FIG. 9 (PRIOR ART)

```
1:   int i;
2:   char a[100], b[100];
3:
4:   main()
5:   {
6:       for(i = 0; i <= 100; ++i)
7:       {
8:           a[i] = b[i] + i;
9:       }
10:  }
```

SOURCE PROGRAM
(sample.c)

FIG. 10 (PRIOR ART)

```
for(i = 0; i <= 100; i+=4)
{
    a[i]   = b[i]   + i;
    a[i+1] = b[i+1] + i + 1;
    a[i+2] = b[i+2] + i + 2;
    a[i+3] = b[i+3] + i + 3;
}
```

OPTIMIZATION IMAGE

FIG. 11A
(PRIOR ART)

```
_main:
    FILE    sample.c
    LINE    5
    LDC     0
    STR     _i          i = 0
.L1:
    FILE    sample.c
    LINE    8
    LOD     _i
    LDA     _a
    ADD                 ADDRESS OF a[i]
    LOD     _i
    LDA     _b
    ADD                 ADDRESS OF b[i]
    ILD                 b[i]
    LOD     _i          i
    ADD                 b[i] + i
    IST                 a[i] = b[i] + i
    ;
    LOD     _i
    LDC     1
    ADD                 i + 1
      :
    ADD                 i + 1
    ADD                 b[i+1] + i + 1
    IST                 a[i+1] = b[i+1] + i
    ;
    LOD     _i
    LDC     2
    ADD                 i + 2
      :
    ADD                 i + 2
    ADD                 b[i+2] = i + 2
    IST                 a[i+2] = b[i+2] + i + 2
    ;
```

FIG. 11B
(PRIOR ART)

```
LOD      _i
LDC
ADD              i + 3
LDA      _a
ADD              ADDRESS OF a[i+3]
LOD      _i
LDC      3
ADD              i + 3
LDA      _b
ADD              ADDRESS OF b[i+3]
ILD              b[i+3]
LOD      _i      i
LDC      3
ADD              i + 3
ADD              b[i+3] = i + 3
IST              a[i+3] = b[i+3] + i + 3
;
LOD      _i
LDC      4
ADD              i + 4
STR      _i      i = i + 4 (i += 4)
;
FILE     sample.c
LINE     6
LOD      _i
LDC      100
CMP              i <= 100
LEQ      .L1
```

LANGUAGE PROCESSING SYSTEM WHICH GENERATES DEBUGGING SOURCE FILE CORRESPONDING TO OPTIMIZATION IMAGE AND METHOD THEREFOR

BACKGROUND OF THE INVENTION

1. Field of the Invention

The present invention relates to a language processing system which analyzes a source file to generate an object file and, more particularly, to a language processing system which generates a debugging source file for facilitating debug of a source file.

2. Description of the Related Art

A conventional language processing system which analyzes a source file to generate an object file includes a parsing unit 801, an optimization unit 802 and a code generating unit 803 as shown in FIG. 8. The parsing unit 801 receives input of a source file 810 and conducts parsing processing of the same to generate intermediate data 820 expressed in an intermediate language. The optimization unit 802 receives input of the intermediate data 820 generated by the parsing unit 801 and conducts optimization processing of the same to generate optimized intermediate data 830. The code generating unit 803 receives input of the intermediate data 830 optimized by the optimization unit 802 and codes the same to generate an object file 840. The generated plurality of object files 840 are linked to a library to make a file of execute form, which is applied to a debugger together with the source file 810.

Possible method of optimizing the intermediate data 820 by the optimization unit 802 is disclosed, for example, in Japanese Patent Laying-Open (Kokai) No. Heisei 5-158706, entitled "Intermediate Language Optimization Processing System". The literature recites a compiler which includes an analysis means for analyzing a high-level language program to generate intermediate language data and a code generating means for generating a low-level language program from the intermediate language data, with the code generating means including an intermediate language optimization means for receiving input of an intermediate language and optimizing the same based on an intermediate language optimization program written according to intermediate language optimization writing syntax, thereby executing optimization processing at an intermediate language level independently of code generation processing.

The debugger having received the object file 840 and the source file 810 debugs optimized codes. Here, one of debug information in the object file 840 is row numbers each of which corresponds to one address. This enables execution and debug of a program on a basis of one row of the source program 810 by using the debug information in the object file 840.

With reference to FIGS. 9 to 11A and 11B, description will be here given of debug of an optimized code by a debugger. FIG. 9 shows a source program. In the figure, row numbers are assigned for convenience of explanation. FIG. 10 shows optimization image of the source program illustrated in FIG. 9. Although there are various kinds of optimization, description will be here made taking notice of development of a loop. In order to improve execution performance, optimization by reducing the number of condition determinations and branches to one-fourth is conducted to replace the source program into sequential assignment statements. FIG. 11A and 11B shows optimized intermediate data and debug information related to the source program of FIG. 9. In FIG. 11A and 11B, a part of the source program is indicated on the right side of the intermediate language. Each intermediate language signifies as follows.

XXX: label
FILE: file name (debug information)
LINE: row number (debug information)
LDC: loading of constant
STR: store into variable
LOD: loading of variable
LDA: loading of address of variable
ADD: addition
ILD: loading of data at addressed position
IST: storing of data at addressed position
CMP: comparison
LEG: condition branch Under the foregoing conditions, if source debug is conducted with a breakpoint set on the eighth row of FIG. 9, debug would stop at a position corresponding to the row number "8" of the debug information. In the illustrated example, however, assignment statements will be developed as shown in FIG. 10 and row numbers only exist at the end of assignment statements developed over a plurality of rows as shown in FIG. 11. One execution will therefore result in completion of four assignment statements.

As described in the foregoing, in source-level debug using an object generated by a conventional language processing system, high-level optimization processing might in some cases cause deletion and shift of codes to disable setting of a breakpoint for use in debug or cause operation in debug to incorrectly correspond to a source program to make understanding difficult. In such a case, reference to an assembler source program is required, which makes work laborious.

In addition, for generating debug information substantially correctly corresponding to a source program, there is a case where optimization processing can not be conducted. Therefore, the above-described conventional system is impractical.

Generation of an object and debug information corresponding to a source program can be realized by lowering an optimization level at the time of object generation so as not to adversely affect source-level debug or canceling optimization processing. In this case, however, since satisfactory optimization processing is not conducted, even if debug ends normally, an object file execution speed might be unsatisfactory or a code size might be increased.

Furthermore, if after debug, a desired optimization level is designated to again generate an object for the purpose of conducting satisfactory optimization processing, there is no guarantee that this execute form normally operates. This is because the possibility can not be denied that there remains a difference in operation and timing due to a difference in an object execution speed or a problem of a language processing program.

SUMMARY OF THE INVENTION

An object of the present invention is to provide a language processing system which generates a debugging source file and debug information corresponding to optimization image to enable source debug to be conducted with ease without a need of reference to an assembler source program hard to understand when execution of a program fails to correspond to a source program in debug, and a method therefor.

Another object of the present invention is to provide a language processing system which ensures a desired optimization level without unnecessarily lowering optimization level at optimization processing, thereby preventing an object file execution speed from becoming unsatisfactory or increase in code size, and a method therefor.

According to the first aspect of the invention, a language processing system which analyzes a source file to generate intermediate data and optimizes and codes the data to generate an object file, comprises parsing means for receiving input of a source file to be processed and conducting parsing processing of the same to generate intermediate data, optimization means for receiving input of intermediate data generated by the parsing means and conducting optimization processing of the same, debugging source program information generating means for receiving input of the intermediate data optimized by the optimization means to generate a debugging source file which reflects the contents of the optimization and whose form is approximate to that of the source file based on the intermediate data, and further, adding debug information obtained in the course of the generation of the debugging source file to the optimized intermediate data, and code generating means for receiving input of the intermediate data with debug information added by the debugging source program information generating means and coding the same to generate an object file.

In the preferred construction, the debugging source program information generating means repeatedly executes the processing of reading one block of target blocks defined in optimization processing out of the intermediate data optimized by the optimization means, extracting source program information constituting a debugging source file from the read one block of the intermediate data and adding debug information to the one block of the intermediate data with respect to each of all the target blocks of the intermediate data.

In the preferred construction, the language processing system further comprises in place of the optimization means and the debugging source program information generating means, optimization means with a debugging source program information generating function for receiving input of intermediate data generated by the parsing means and conducting optimization processing of the same, as well as generating a debugging source file which reflects the contents of optimization and whose form is approximate to that of the source file based on the optimized intermediate data, and further, adding debug information obtained in the course of the generation of the debugging source file to the optimized intermediate data.

In the preferred construction, the language processing system further comprises in place of the optimization means and the debugging source program information generating means, optimization means with a debugging source program information generating function for receiving input of intermediate data generated by the parsing means and conducting optimization processing of the same, as well as generating a debugging source file which reflects the contents of optimization and whose form is approximate to that of the source file based on the optimized intermediate data, and further, adding debug information obtained in the course of the generation of the debugging source file to the optimized intermediate data, wherein the optimization means with a debugging source program information generating function repeatedly executes the processing of reading one block of target blocks defined in optimization processing out of the intermediate data generated by the parsing means and optimizing the read one block of the intermediate data, as well as extracting source program information constituting a debugging source file from the optimized intermediate data and adding debug information to the one block of the intermediate data, with respect to each of all the target blocks of the intermediate data.

According to the second aspect of the invention, a language processing method of analyzing a source file to generate intermediate data and optimizing and coding the data to generate an object file, comprising the steps of:

receiving input of a source file to be processed and conducting parsing processing of the same to generate intermediate data;

receiving input of intermediate data generated at the parsing step and conducting optimization processing of the same;

receiving input of the intermediate data optimized at the optimization step to generate a debugging source file which reflects the contents of optimization and whose form is approximate to that of the source file based on the intermediate data, and further, adding debug information obtained in the course of the generation of the debugging source file to the optimized intermediate data; and receiving input of the intermediate data with debug information added at the debugging source program information generating step and coding the same to generate an object file.

In the preferred construction, the debugging source program information generating step comprises the steps of:

reading one block of target blocks defined in optimization processing out of the intermediate data optimized at the optimization step, extracting source program information constituting a debugging source file from the read one block of the intermediate data, and adding debug information to the one block of the intermediate data, and wherein each processing of the respective steps is repeatedly executed with respect to each of all the target blocks of the intermediate data.

In another preferred construction, the language processing method further comprising the step of, in place of the optimization step and the debugging source program information generating step, receiving input of intermediate data generated at the parsing step and conducting optimization processing of the same, as well as generating a debugging source file which reflects the contents of optimization and whose form is approximate to that of the source file based on the optimized intermediate data, and further, adding debug information obtained in the course of the generation of the debugging source file to the optimized intermediate data.

In another preferred construction, the language processing method further comprising the step of, in place of the optimization step and the debugging source program information generating step, receiving input of intermediate data generated at the parsing step and conducting optimization processing of the same, as well as generating a debugging source file which reflects the contents of optimization and whose form is approximate to that of the source file based on the optimized intermediate data, and further, adding debug information obtained in the course of the generation of the debugging source file to the optimized intermediate data, the step of optimization with a debugging source program information generating function comprising the steps of:

reading one block of target blocks defined in optimization processing out of the intermediate data generated at the parsing step, optimizing the read one block of the intermediate data, as well as extracting source program information constituting a debugging source file from the optimized intermediate data, and adding debug information to the one block of the intermediate data, wherein each processing of the respective steps is repeatedly executed with respect to each of all the target blocks of the intermediate data.

According to the third aspect of the invention, a computer readable memory having a language processing program for analyzing a source file to generate intermediate data and optimizing and coding the data to generate an object file, the language processing program comprising the steps of:

receiving input of a source file to be processed and conducting parsing processing of the same to generate intermediate data;

receiving input of intermediate data generated at the parsing step and conducting optimization processing of the same;

receiving input of the intermediate data optimized at the optimization step to generate a debugging source file which reflects the contents of optimization and whose form is approximate to that of the source file based on the intermediate data, and further, adding debug information obtained in the course of the generation of the debugging source file to the optimized intermediate data; and receiving input of the intermediate data with debug information added at the debugging source program information generating step and coding the same to generate an object file.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 3 is a diagram showing an example of a debugging source file generated by the debugging source program information generating unit according to the first embodiment.

FIGS. 4A and 4B combine to show an example of intermediate data and debug information generated by the debugging source program information generating unit according to the first embodiment.

FIG. 5 is a diagram showing an example of a debug screen for use in debug processing.

FIG. 9 is a diagram showing an example of a source program.

FIG. 10 is a diagram showing optimization image for the source program shown in FIG. 9.

FIGS. 11A and 11B combine to show intermediate data and debug information optimized with respect to the source program of FIG. 9.

DESCRIPTION OF THE PREFERRED EMBODIMENTS

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
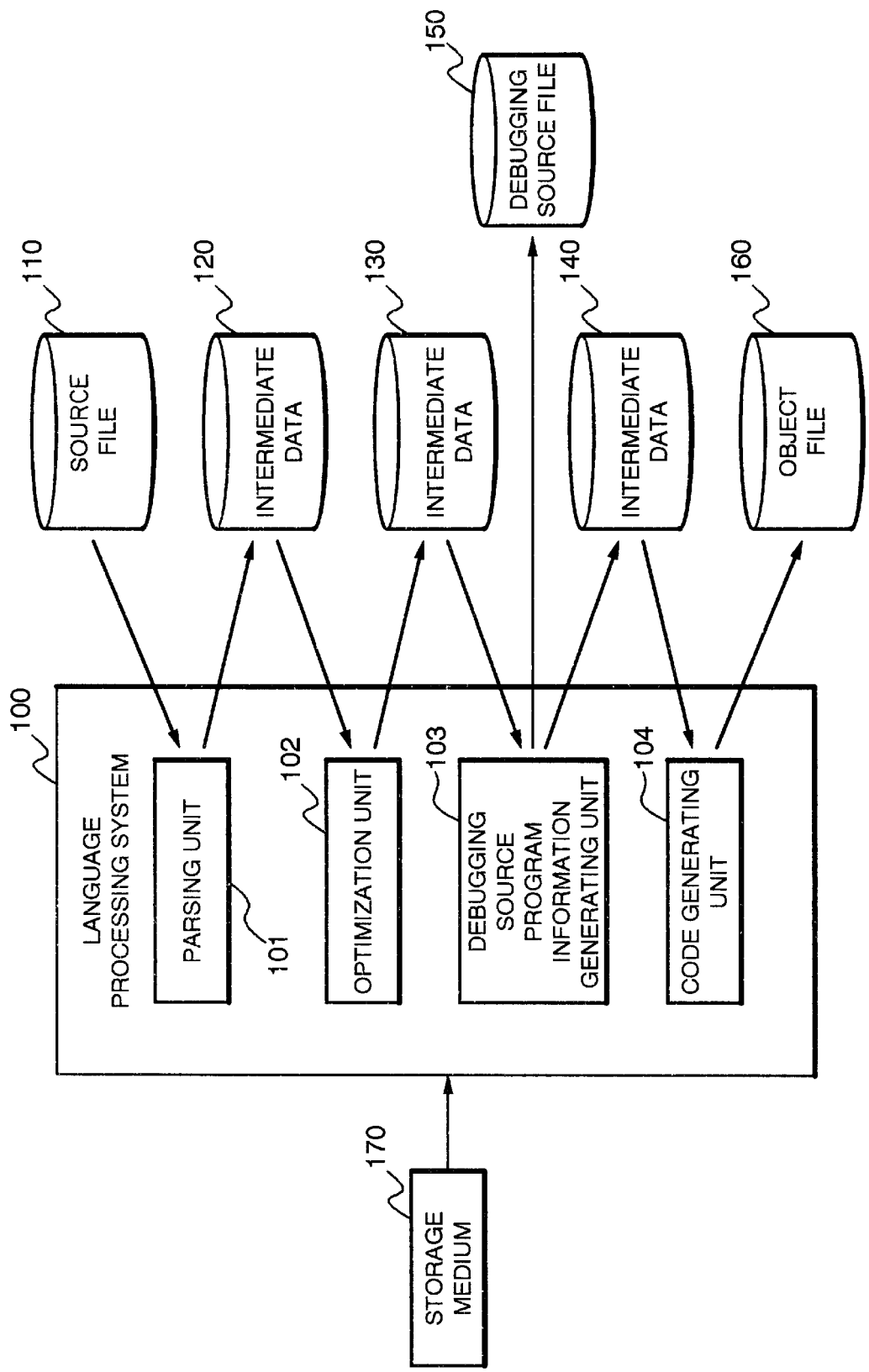
FIG. 1 is a block diagram showing structure of a language processing system according to a first embodiment of the present invention.

FIG. 1 is a block diagram showing structure of a language processing system according to a first embodiment of the present invention. With reference to FIG. 1, a language processing system 100 of the present embodiment includes a parsing unit 101 for receiving input of a source file 110 and conducting parsing processing of the same, an optimization unit 102 for optimizing a file parsed by the parsing unit 101, a debugging source program information generating unit 103 for generating debugging source program information based on a file optimized by the optimization unit 102, and a code generating unit 104 for coding a file subjected to the processing by the debugging source program information generating unit 103 to generate an object file. In FIG. 1, illustration is made only of a characteristic part of the structure of the present embodiment and that of the remaining common part is omitted.

The respective components constituting the language processing system 100 are implemented by computer-program-controlled CPU and internal memory such as a RAM. The computer program is provided as storage in a storage medium 170 such as a magnetic disk or a semiconductor memory. Loading the program into a computer system such as a personal computer or a workstation realizes each function of the above-described components.

The parsing unit 101 receives input of the source file 110 and conducts parsing processing of the same to generate intermediate data 120. Various conventional methods can be used for the parsing processing.

The optimization unit 102 receives input of the intermediate data 120 generated by the parsing unit 101 and conducts optimization processing of the same. For the optimization processing, various conventional methods can be used such as that recited in Japanese Patent Laying-Open (Kokai) No. Heisei 5-158706 set forth above.

Figure 2:
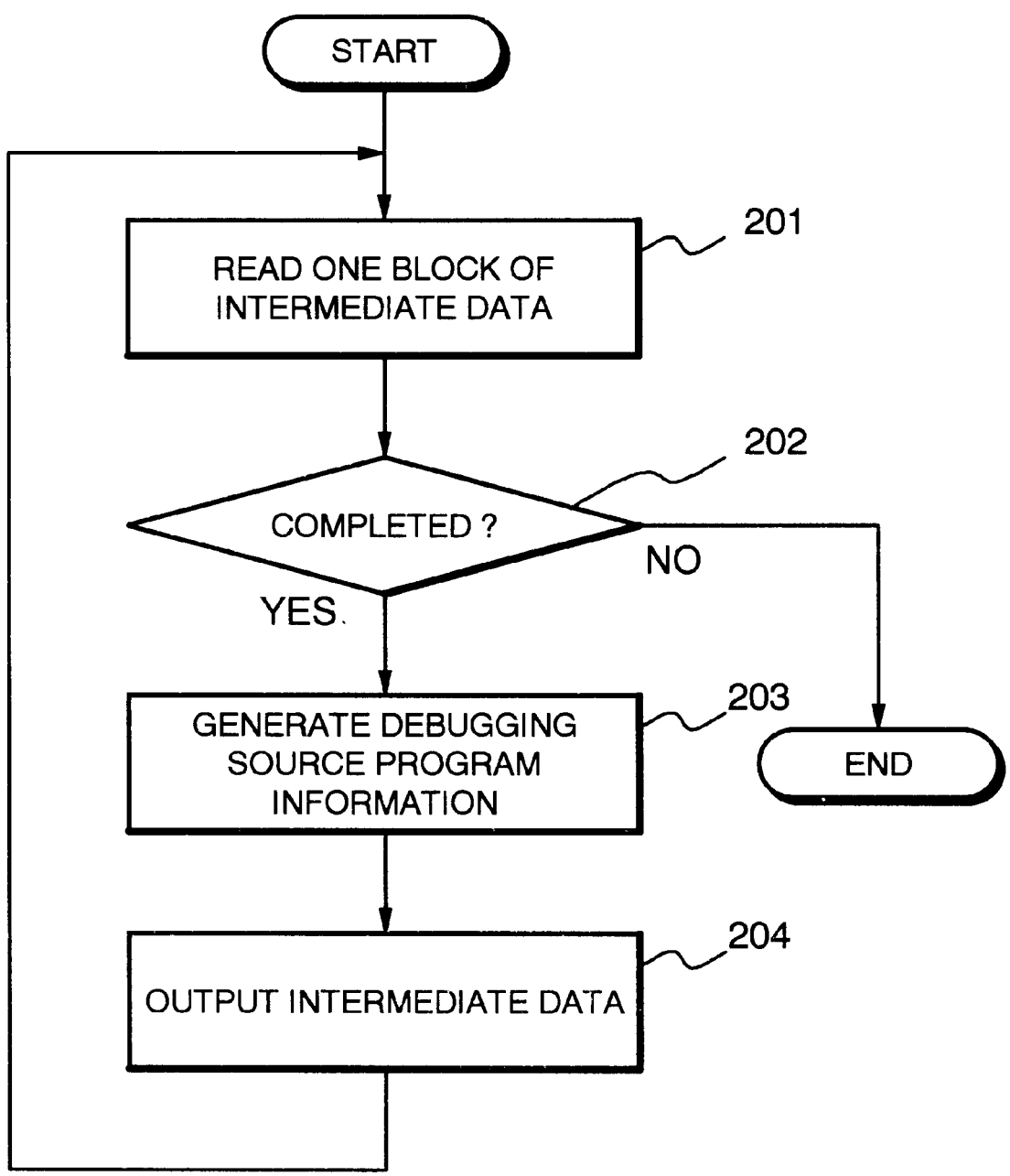
FIG. 2 is a flow chart showing operation of a debugging source program information generating unit in the first embodiment.

The debugging source program information generating unit 103 receives input of intermediate data 130 optimized by the optimization unit 102 to generate a debugging source file 150 based on the intermediate data 130. The unit 103 also inserts information regarding the generated debugging source file into the intermediate data 130. FIG. 2 is a flow chart showing operation of the debugging source program information generating unit 103. With reference to FIG. 2, the debugging source program information generating unit 103 first reads one block of the intermediate data 130 (Step 201). When there exists a block yet to be processed in the intermediate data 130, the unit 103 analyzes the read intermediate data to output source program information to the debugging source file 150 (Steps 202 and 203). Then, the unit 103 adds debug information to the intermediate data 130 and outputs the obtained data as intermediate data 140 (Step 204). The unit 103 repeats the foregoing operation with respect to each block of all the intermediate data 130 (Step 202). As a result, generated are the debugging source file 150 having the form approximate to that of the original source file, as well as reflecting the contents of optimization processing, and the intermediate data 140 with debug information added thereto.

The code generating unit 104 receives input of the intermediate data 140 having debug information added by the debugging source program information generating unit 103 and conducts coding processing of the same to generate an object file 160. For the coding processing, various conventional methods can be used.

Next, description will be made of operation of the present embodiment with respect to an example of processing with respect to the concrete source file 110. Since in the language processing system 100, processing by the parsing unit 101 and the optimization unit 102 is the same as that in a conventional language processing system, intermediate data and debug information shown in FIGS. 11A and 11B are employed as a file of the intermediate data 130 parsed by the parsing unit 101 and optimized by the optimization unit 102. In addition, for convenience of explanation, description will be started at input after label L1 on the fourth row of the intermediate data shown in FIGS. 11A and 11B.

First, the debugging source program information generating unit 103 reads one block of the intermediate data 130 between label L1 and ";" (Step 201). Then, the unit 103 analyzes the read intermediate data 130 and outputs corresponding source program information to the debugging source file 150 (Step 203). The output source program information corresponds to the eighth row of a debugging source program (sample_o.c) shown in FIG. 3. Next, the unit 103 adds the file name and the row number as debug information to the intermediate data and outputs the obtained data as the intermediate data 140 (Step 204). The added debug information is, out of the intermediate data 140 and the debug information shown in FIGS. 4A and 4B, "FILE sample_o.c" 141 and the subsequent "LINE 8".

Next, back to Step 201, the unit 103 reads the subsequent one block of the intermediate data 130 up to ";" (Step 201). Then, the unit 103 analyzes the read intermediate data 130 and outputs corresponding source program information to the debugging source file 150 (Step 203). The output source program information corresponds to the ninth row of the debugging source program (sample_o.c) shown in FIG. 3. Next, the unit 103 adds the file name and the row number as debug information to the intermediate data and outputs the obtained data as the intermediate data 140 (Step 204). The added debug information is, out of the intermediate data 140 and the debug information illustrated in FIGS. 4A and 4B, "FILE sample_o.c" 142 and the subsequent "LINE 9".

Next, back to Step 201, the unit 103 generates the debugging source file 150 and the intermediate data 140 corresponding to each one block of the intermediate data 130 in the same manner. Then, at a time point when there no more remains intermediate data to be read in the intermediate data 130, the processing is completed (Step 202).

Next, description will be made of a debugging method using the debugging source file 150 generated in the above-described processing. FIG. 5 is a debug screen which displays the source program (sample.c) shown in FIG. 9 and the debugging source program (sample_o.c) shown in FIG. 3 side by side. For example, in debug using an original source program (sample.c), when operation of the program fails to correspond to the source program due to optimization, the debugging source program (sample_o.c) in addition to the source program (sample.c) is displayed by the use of the source program reading function or the source path setting function by a debugger.

In the example shown in FIG. 5, how the "for" loop of the source program (sample.c) is developed by optimization can be seen by the reference to the debugging source program (sample_o.c). More specifically, although the form of the "for" loop is changed, the eighth row of the source program (sample.c) corresponds to the eighth to eleventh rows of the debugging source program (sample_o.c). Therefore, when optimized object file and source program (sample.c) are used, it is impossible to confirm operation in the developed "for" loop, while when the debugging source program (sample_o.c) is used, setting a breakpoint, for example, at the tenth row of the debugging source program (sample_o.c) enables the program to be stopped before the execution of the tenth row. Then, execution of one row enables the contents of execution of the tenth row to be confirmed. It is also clearly understood that setting a breakpoint at the eleventh row enables confirmation of the execution result of the tenth row as well.

Figure 6:
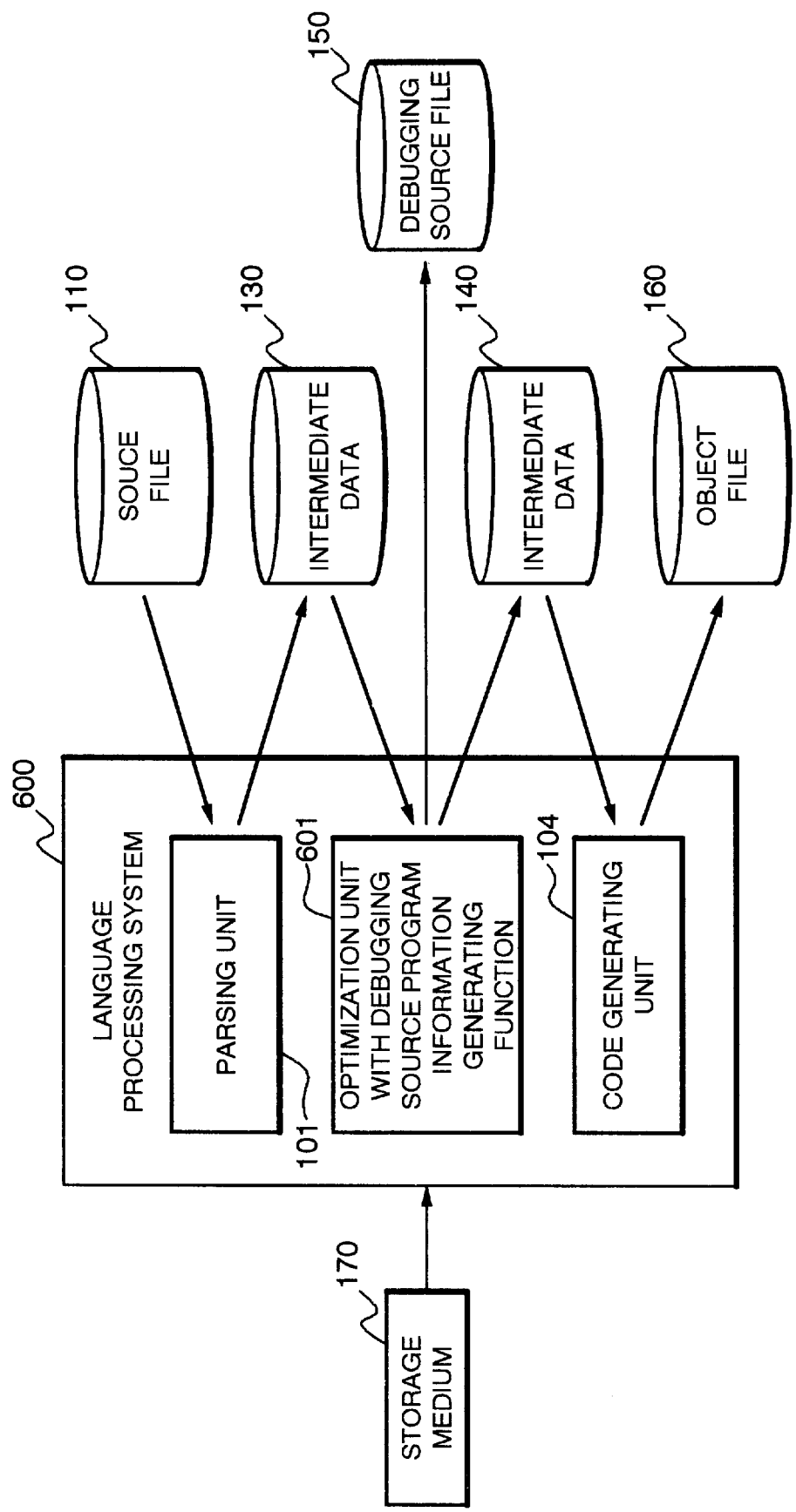
FIG. 6 is a block diagram showing structure of a language processing system according to a second embodiment of the present invention.

FIG. 6 is a block diagram showing structure of a language processing system according to a second embodiment of the present invention. With reference to FIG. 6, a language processing system 600 of the present embodiment includes a parsing unit 101 for receiving input of a source file 110 and conducting parsing processing of the same, an optimization unit 601 with a debugging source program information generating function for conducing optimization processing of a file subjected to the parsing processing by the parsing unit 101, as well as generating debugging source program, and a code generating unit 104 for conducting coding processing of a file subjected to the processing by the optimization unit 601 with a debugging source program information generating function to generate an object file. In FIG. 6, illustration is made only of a characteristic part of the structure of the present embodiment and that of the remaining common part is omitted.

The respective components constituting the language processing system 600 are implemented by computer-program-controlled CPU and internal memory such as a RAM. The computer program is provided as storage in a storage medium 170 such as a magnetic disk or a semiconductor memory. Loading the program into a computer system such as a personal computer or a workstation realizes each function of the respective components.

In the above-described structure, the parsing unit 101 and the code generating unit 104 are the same as their counterpart components of the first embodiment shown in FIG. 1, to which the same reference numerals are allotted to omit their description.

The optimization unit 601 with a debugging source program information generating function receives input of intermediate data 120 generated by the parsing unit 101 and conducts optimization processing of the same. At this time, corresponding to each one block of intermediate data to be generated, the unit 601 outputs source program information to a debugging source file 150, and further, adds debug information to the optimized intermediate data to generate intermediate data 140.

While in the above-described first embodiment, the optimization unit 102 and the debugging source program information generating unit 103 are provided separately to conduct the optimization processing and the processing of generating the debugging source file 150 and intermediate data 140 independently, in the present embodiment provided with the optimization unit 601 with a debugging source program information generating function, optimization processing is conducted while the debugging source file 150 is sequentially generated and debug information is added to optimized intermediate data. The debugging source program information generating unit 103 provided separately from other modules as in the first embodiment makes development and maintenance easy but might result in making an execution time longer because file reading is conducted at each processing. The present embodiment therefore aims at reducing an execution time by conducting optimization processing and processing of generating the debugging source file 150 and the intermediate data 140 simultaneously.

Figure 7:
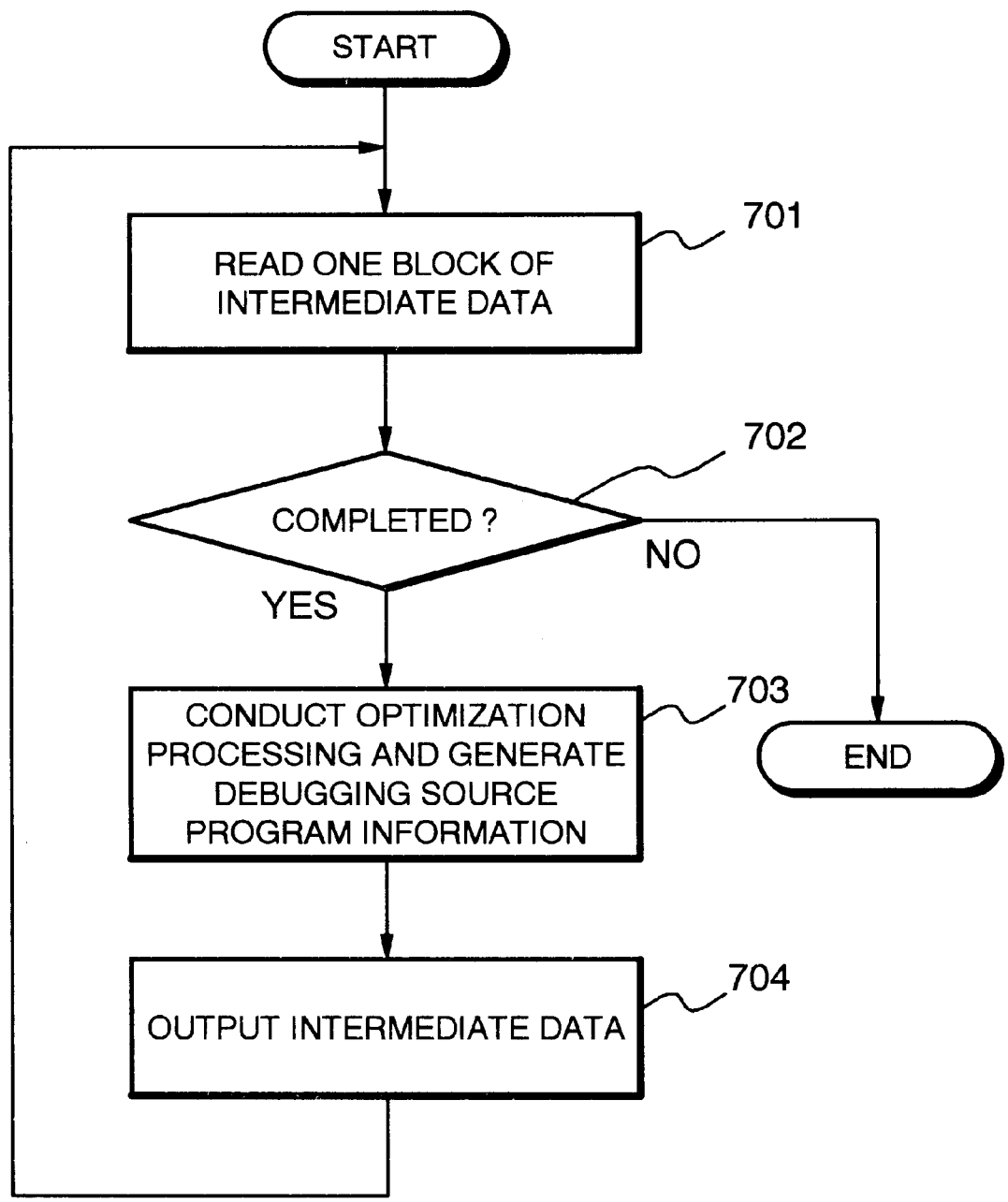
FIG. 7 is a flow chart showing operation of an optimization unit with a debugging source program information generating function according to the second embodiment.
Figure 8:
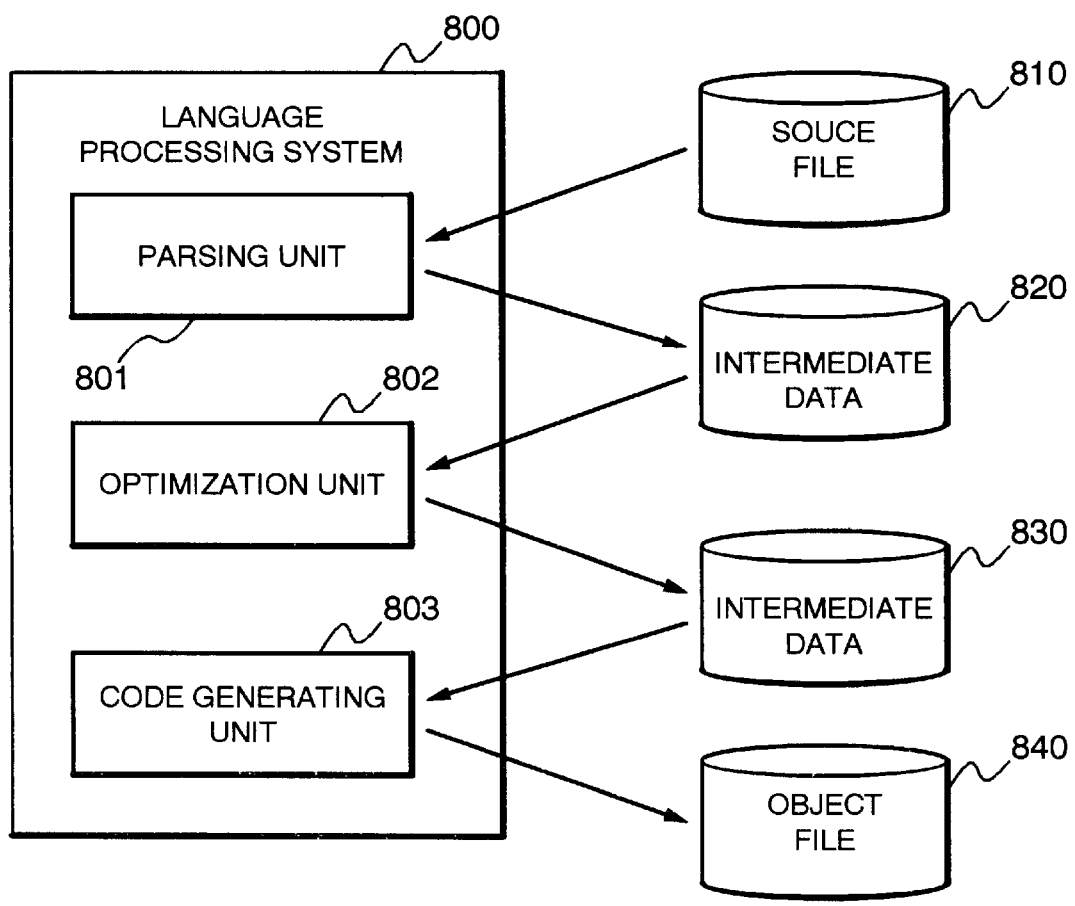
FIG. 8 is a block diagram showing structure of a conventional language processing system.

FIG. 7 is a flow chart showing operation of the optimization unit 601 with a debugging source program information generating function. With reference to FIG. 7, the optimization unit 601 with a debugging source program information generating function first reads one block of target blocks defined in optimization processing out of the intermediate data 120 (step 701). If there exists a block yet to be processed in the intermediate data 120, the unit 601 analyzes the read intermediate data and conducts optimization processing of the same, as well as outputting source program information as the debugging source file 150 (Steps 702 and 703). Then, the unit 601 adds debug information to the optimized intermediate data and outputs the obtained data as the intermediate data 140 (Step 704). The foregoing operation will be repeated with respect to each block of all the intermediate data 120 (Step 702).

Next, operation of the present embodiment will be described with respect to an example of processing with respect to the concrete source file 110. In the present operation example, the source program shown in FIG. 9 is used as the source file 110. In addition, for convenience of explanation, description will be started at input after the sixth row of the source program shown in FIG. 9. Although in practice, parsing processing is conducted with respect to the source program by the parsing unit 101, no description will be made thereof and description will be here made taking notice of processing subsequent to the optimization processing.

First, out of the source program shown in FIG. 9, the unit 601 reads the intermediate data 120 corresponding to the sixth and the following rows of the source program (Step 701). The unit 601 here reads the intermediate data 120 corresponding to the source program on and after the sixth row up to the ninth row, which is a target block defined in the optimization processing. Then, the unit 601 analyzes the read intermediate data 120 and develops a loop to conduct optimization. Optimization image in this case is the same as that shown in FIG. 10. The unit 601 also sequentially outputs source program information corresponding to one row of the intermediate data 120 being processed to the debugging source file 150 (Step 703). The output source program information corresponds to the seventh to 13th rows of the debugging source program (sample_o.c) shown in FIG. 3. Then, the unit 601 adds the file name and the row number corresponding to the developed one row to the intermediate data and outputs the obtained data as the intermediate data 140 (Step 704). The added debug information is, out of the intermediate data 140 and the debug information illustrated in FIG. 4, "FILE sample_o.c" 141 and the subsequent "LINE 8".

Next, back to Step 701, the unit 601 conducts optimization processing of each one block of the target blocks of the intermediate data 120 in the same manner to generate the debugging source file 150 and the intermediate data 140. At a time point when there no more remains intermediate data to be read in the intermediate data 120, the processing is completed (Step 702).

As described in the foregoing, according to the language processing system of the present invention and the method therefor, generating debugging source program information from an intermediate language subjected to optimization processing enables source debug using an optimized object file. More specifically, when execution of a program fails to correspond to a source program in debugging, how optimization processing is conducted can be recognized by referring to not an assembler source program hard to understand but a debugging source program whose form is approximate to the original source program in addition to the original source program. This makes understanding of program operation easy and allows source debug to be conducted with ease.

Moreover, since the present invention enables source debug using an optimized object file, optimization processing can be executed at a desired optimization level without lowering an optimization level unnecessarily at the optimization processing. As a result, it is possible to prevent an object file execution speed from becoming unsatisfactory and increase in code size.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A language processing system which analyzes a source file to generate intermediate data and optimizes and codes the data to generate an object file, comprising:

parsing means for receiving input of a source file to be processed and conducting parsing processing of the same to generate intermediate data;

optimization means for receiving input of intermediate data generated by said parsing means and conducting optimization processing of the same;

debugging source program information generating means for receiving input of said intermediate data optimized by said optimization means to generate a debugging source file which reflects the contents of the optimization and whose form is approximate to that of said source file based on the intermediate data, and further, adding debug information obtained in the course of the generation of said debugging source file to said optimized intermediate data; and code generating means for receiving input of said intermediate data with debug information added by said debugging source program information generating means and coding the same to generate an object file.

2. The language processing system as set forth in claim 1, wherein said debugging source program information generating means repeatedly executes the processing of reading one block of target blocks defined in optimization processing out of said intermediate data optimized by said optimization means, extracting source program information constituting a debugging source file from said read one block of said intermediate data and adding debug information to said one block of said intermediate data with respect to each of all the target blocks of said intermediate data.

3. The language processing system as set forth in claim 1, further comprising, in place of said optimization means and said debugging source program information generating means, optimization means with a debugging source program information generating function for receiving input of intermediate data generated by said parsing means and conducting optimization processing of the same, as well as generating a debugging source file which reflects the contents of optimization and whose form is approximate to that of said source file based on the optimized intermediate data, and further, adding debug information obtained in the course of the generation of said debugging source file to the optimized intermediate data.

4. The language processing system as set forth in claim 1, further comprising, in place of said optimization means and said debugging source program information generating means, optimization means with a debugging source program information generating function for receiving input of intermediate data generated by said parsing means and conducting optimization processing of the same, as well as generating a debugging source file which reflects the contents of optimization and whose form is approximate to that of said source file based on the optimized intermediate data, and further, adding debug information obtained in the course of the generation of said debugging source file to the optimized intermediate data, wherein said optimization means with a debugging source program information generating function repeatedly executes the processing of reading one block of target blocks defined in optimization processing out of said intermediate data generated by said parsing means and optimizing said read one block of said intermediate data, as well as extracting source program information constituting a debugging source file from the optimized intermediate data and adding debug information to said one block of said intermediate data, with respect to each of all the target blocks of said intermediate data.

5. A language processing method of analyzing a source file to generate intermediate data and optimizing and coding the data to generate an object file, comprising the steps of:

receiving input of a source file to be processed and conducting parsing processing of the same to generate intermediate data;

receiving input of intermediate data generated at said parsing step and conducting optimization processing of the same;

receiving input of said intermediate data optimized at said optimization step to generate a debugging source file which reflects the contents of optimization and whose form is approximate to that of said source file based on the intermediate data, and further, adding debug information obtained in the course of the generation of said debugging source file to said optimized intermediate data; and receiving input of said intermediate data with debug information added at said debugging source program information generating step and coding the same to generate an object file.

6. The language processing method as set forth in claim 5, wherein said debugging source program information generating step comprises the steps of:

reading one block of target blocks defined in optimization processing out of said intermediate data optimized at said optimization step, extracting source program information constituting a debugging source file from said read one block of said intermediate data, and adding debug information to said one block of said intermediate data, and wherein each processing of the respective steps is repeatedly executed with respect to each of all the target blocks of said intermediate data.

7. The language processing method as set forth in claim 5, further comprising the step of, in place of said optimization step and said debugging source program information generating step, receiving input of intermediate data generated at said parsing step and conducting optimization processing of the same, as well as generating a debugging source file which reflects the contents of optimization and whose form is approximate to that of said source file based on the optimized intermediate data, and further, adding debug information obtained in the course of the generation of said debugging source file to the optimized intermediate data.

8. The language processing method as set forth in claim 5, further comprising the step of, in place of said optimization step and said debugging source program information generating step, receiving input of intermediate data generated at said parsing step and conducting optimization processing of the same, as well as generating a debugging source file which reflects the contents of optimization and whose form is approximate to that of said source file based on the optimized intermediate data, and further, adding debug information obtained in the course of the generation of said debugging source file to the optimized intermediate data, wherein said step of optimization with a debugging source program information generating function comprising the steps of:

reading one block of target blocks defined in optimization processing out of said intermediate data generated at said parsing step, optimizing said read one block of said intermediate data, as well as extracting source program information constituting a debugging source file from the optimized intermediate data, and adding debug information to said one block of said intermediate data, wherein each processing of the respective steps is repeatedly executed with respect to each of all the target blocks of said intermediate data.

9. A computer readable memory having a language processing program for analyzing a source file to generate intermediate data and optimizing and coding the data to generate an object file, said language processing program comprising the steps of:

receiving input of a source file to be processed and conducting parsing processing of the same to generate intermediate data;

receiving input of intermediate data generated at said parsing step and conducting optimization processing of the same;

receiving input of said intermediate data optimized at said optimization step to generate a debugging source file which reflects the contents of optimization and whose form is approximate to that of said source file based on the intermediate data, and further, adding debug information obtained in the course of the generation of said debugging source file to said optimized intermediate data; and receiving input of said intermediate data with debug information added at said debugging source program information generating step and coding the same to generate an object file.

10. The computer readable memory having as set forth in claim 9, wherein said debugging source program information generating step in said language processing program comprises the steps of:

reading one block of target blocks defined in optimization processing out of said intermediate data optimized at said optimization step, extracting source program information constituting a debugging source file from said read one block of said intermediate data, and adding debug information to said one block of said intermediate data, and wherein each processing of the respective steps is repeatedly executed with respect to each of all the target blocks of said intermediate data.

11. The computer readable memory having as set forth in claim 9, wherein said language processing program further comprises the step of, in place of said optimization step and said debugging source program information generating step, receiving input of intermediate data generated at said parsing step and conducting optimization processing of the same, as well as generating a debugging source file which reflects the contents of optimization and whose form is approximate to that of said source file based on the optimized intermediate data, and further, adding debug information obtained in the course of the generation of said debugging source file to the optimized intermediate data.

12. The computer readable memory having as set forth in claim 9, wherein said language processing program further comprises the steps of, in place of said optimization step and said debugging source program information generating step, receiving input of intermediate data generated at said parsing step and conducting optimization processing of the same, as well as generating a debugging source file which reflects the contents of optimization and whose form is approximate to that of said source file based on the optimized intermediate data, and further, adding debug information obtained in the course of the generation of said debugging source file to the optimized intermediate data, wherein said step of optimization with a debugging source program information generating function comprising the steps of:

reading one block of target blocks defined in optimization processing out of said intermediate data generated at said parsing step, optimizing said read one block of said intermediate data, as well as extracting source program information constituting a debugging source file from the optimized intermediate data, and adding debug information to said one block of said intermediate data, wherein each processing of the respective steps is repeatedly executed with respect to each of all the target blocks of said intermediate data.

* * * * *